(12) United States Patent
Thorne

(10) Patent No.: US 8,095,316 B2
(45) Date of Patent: Jan. 10, 2012

(54) WELL LOG NORMALIZATION

(75) Inventor: Julian Thorne, Orange, CA (US)

(73) Assignee: Chevron U.S.A. Inc., San Ramon, CA (US)

( * ) Notice: Subject to any disclaimer, the term of this patent is extended or adjusted under 35 U.S.C. 154(b) by 665 days.

(21) Appl. No.: 12/170,069

(22) Filed: Jul. 9, 2008

(65) Prior Publication Data

US 2010/0010745 A1     Jan. 14, 2010

(51) Int. Cl.
*G01V 1/40* (2006.01)
(52) U.S. Cl. .......................................................... 702/7
(58) Field of Classification Search .................. 702/7–13
See application file for complete search history.

(56) References Cited

U.S. PATENT DOCUMENTS

| | | |
|---|---|---|
| 4,327,412 A | 4/1982 | Timmons |
| 4,939,648 A | 7/1990 | O'Neill et al. |
| 7,054,753 B1 | 5/2006 | Williams et al. |
| 7,280,932 B2 | 10/2007 | Zoraster et al. |
| 7,680,600 B2 * | 3/2010 | Carnegie et al. ................ 702/17 |
| 2001/0044698 A1 | 11/2001 | Kim |
| 2007/0276604 A1 | 11/2007 | Williams et al. |

* cited by examiner

*Primary Examiner* — Drew A Dunn
*Assistant Examiner* — Stephen Cherry
(74) *Attorney, Agent, or Firm* — Carlos L. Hanze

(57) ABSTRACT

A method of normalizing well log data relating to geology of a subsurface region includes identifying a pair of markers defining a zone on each well log, determining a statistic for a property within the zone for each well log, fitting a smooth function to the statistics to create a first-iteration trend surface, determining, for each statistic, a deviation from the trend surface and eliminating those statistics that deviate from the trend surface by greater than a threshold value, fitting a smooth function to the remaining statistics to create a second-iteration trend surface, normalizing the property for each well log based on the second-iteration trend surface, and analyzing the normalized properties to determine the geology of the subsurface region.

15 Claims, 3 Drawing Sheets

WELL LOG NORMALIZATION

BACKGROUND

1. Field of the Invention

The present invention relates generally to processing of geological data and more particularly to normalization of well log curves.

2. Description of the Related Art

The geology of a borehole may be explored using borehole logging tools. Measurements of various properties of the subsurface formations through which the borehole penetrates can be made, and a log of the measurements against depth can be produced. This borehole data is collected via a number of techniques including resistivity/conductivity measurements, ultrasound, NMR, and gamma radiation, for example. Generally, borehole data is analyzed by human interpreters in order to characterize a subsurface geological formation to allow decisions to be made regarding potential of the well or to determine information about the nature of the surrounding geologic area. Borehole data of this type may be used to replace or supplement the collection of cores for direct inspection.

As with any measurement, well logging is subject to various causes of noise. For example, sensor noise (including, e.g., shot noise), sensor drift and other effects can cause logs to appear different from a theoretical sensor response.

As a number of different wells are logged, accounting for noise can allow a more accurate comparison between logs, providing a more useful understanding of the subsurface geology. In particular, where automated analysis methods are to be applied to the well logs, such normalization can help to reduce incorrect conclusions resulting from, for example, a gain change of the sensor between logging operations.

SUMMARY

Aspects of embodiments of the present invention provide a method of normalizing well log data relating to geology of a subsurface region, includes identifying a pair of markers defining a zone on each well log, determining a statistic for a property within the zone for each well log, fitting a smooth function to the statistics to create a first-iteration trend surface, determining, for each statistic, a deviation from the trend surface and eliminating those statistics that deviate from the trend surface by greater than a threshold value, fitting a smooth function to the remaining statistics to create a second-iteration trend surface, normalizing the property for each well log based on the second-iteration trend surface, and analyzing the normalized properties to determine information relating to the geology of the subsurface region.

Aspects of embodiments of the invention may include a computer-readable medium encoded with computer-executable instructions for performing the foregoing method or for controlling the foregoing system.

Aspects of embodiments of the invention may include a system configured and arranged to provide control of the system in accordance with the foregoing method. Such a system may incorporate, for example, a computer programmed to allow a user to control the device in accordance with the method, or other methods.

These and other objects, features, and characteristics of the present invention, as well as the methods of operation and functions of the related elements of structure and the combination of parts and economies of manufacture, will become more apparent upon consideration of the following description and the appended claims with reference to the accompanying drawings, all of which form a part of this specification, wherein like reference numerals designate corresponding parts in the various FIGS. It is to be expressly understood, however, that the drawings are for the purpose of illustration and description only and are not intended as a definition of the limits of the invention. As used in the specification and in the claims, the singular form of "a", "an", and "the" include plural referents unless the context clearly dictates otherwise.

DETAILED DESCRIPTION

In a given region of an exploration area, there may be a large number of wells drilled. Some wells are drilled with the hope that they will be production wells, others are for fluid injection, or for testing purposes. During, or after, drilling of each well, one or more well logs may be produced, measuring properties of the subsurface formations through which they are drilled.

By way of example, resistivity and gamma ray logs may be taken to provide analysts with information that they can interpret in order to determine information about conditions in the subsurface region. Gamma ray logs, for example, may be used in assigning facies classifications to layers of subsurface material, allowing experts to identify impermeable layers such as shale that may help to indicate locations where hydrocarbon resources are less likely to be found.

Figure 1:
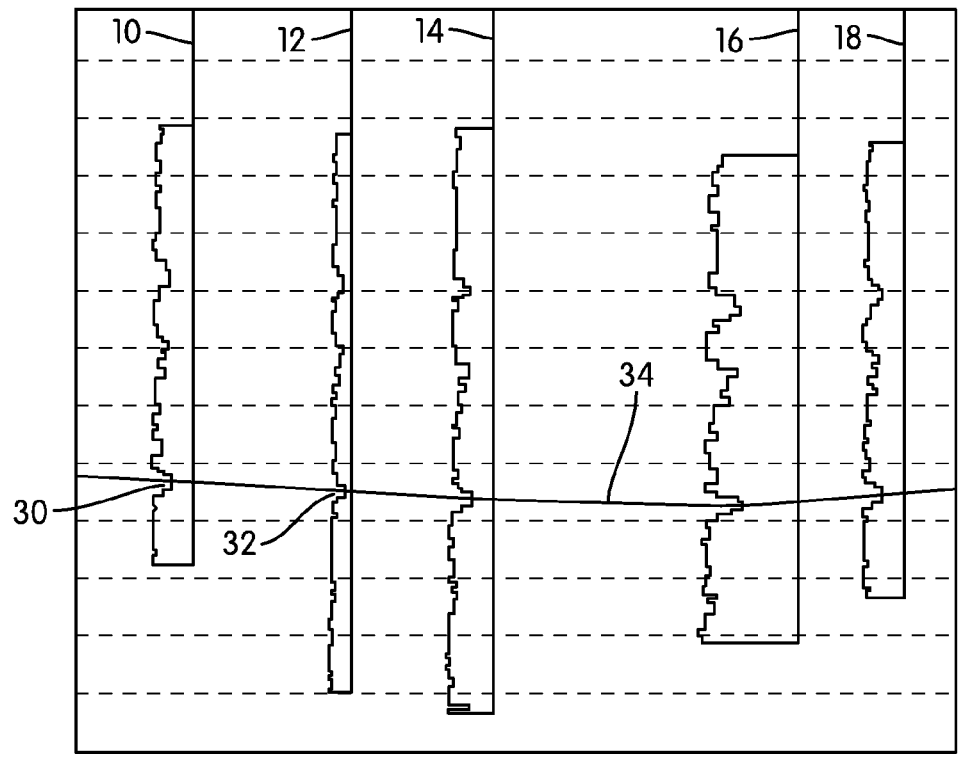
FIG. 1 illustrates a group of well logs to be normalized in accordance with an embodiment of the present invention.

FIG. 1 illustrates five well logs from left to right, 10, 12, 14, 16, 18. The logs represent measurements taken from wells that are relatively near to each other both in depth and in surface location. As a result, there is a reasonable expectation that features visible in each log can be correlated to similar features in the other logs. As expected, large amplitude fluctuations 30, 32 in logs 10 and 12 respectively appear to correlate to one another and may be interpretable as pertaining to a common layer extending along the line 34 passing through the five logs.

As will be appreciated, a number of additional common markers could be located and correlated among the logs, even without any additional pre-processing. On the other hand, it is also clear that, for example, that there is a scaling factor (or gain change) between log 10 and log 12. While the features measured for log 12 appear to be quite well correlated to the features measured for log 10, the amplitudes are considerably smaller. Likewise, the amplitudes of log 16 are considerably larger than either log 10 or log 12, again despite representing measurements of physically similar subsurface features.

Figure 2:
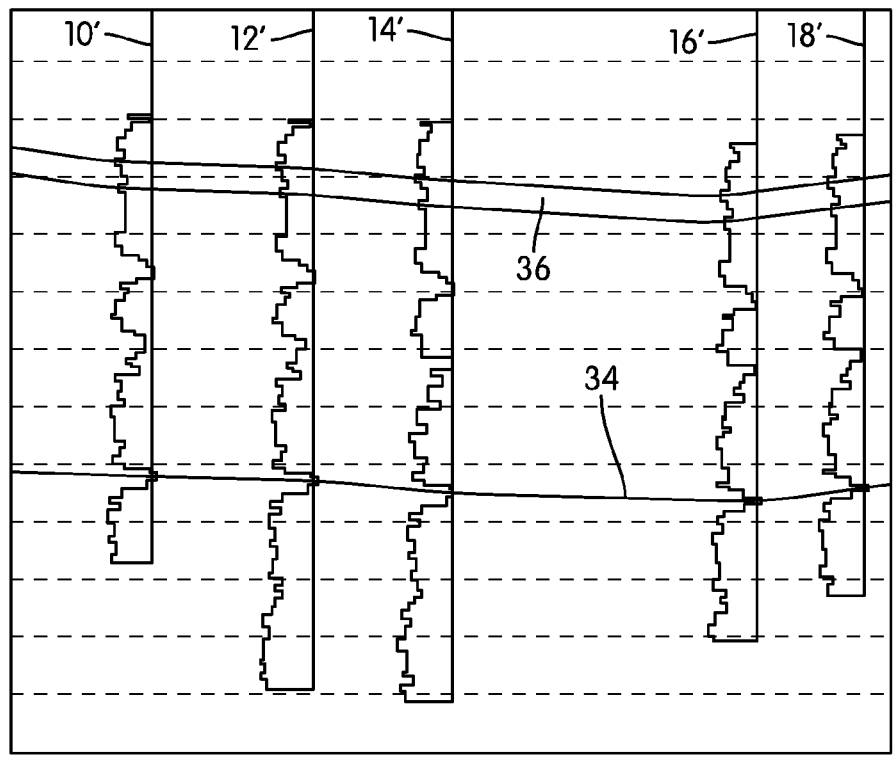
FIG. 2 illustrates the same logs after normalization in accordance with an embodiment of the present invention.

FIG. 2 illustrates the same logs, after normalizing in accordance with an embodiment of the invention. The normalized logs are denoted with the same reference number as the corresponding original log with the addition of a prime, i.e., 10', 12', 14', 16', 18'. As will be seen, the horizon 34 can still be identified as extending through the normalized logs. In addition, structures not evident in the non-normalized logs become visible. For example, a pair of low amplitude regions near the top of each log can be identified in the region 36.

These fluctuations are either not visible at all, or are barely visible in the original logs of FIG. 1, but become quite clear when the logs are normalized as in FIG. 2. Other fine structure, not visible in FIG. 1 is notably shown in FIG. 2, though for the purpose of clarity of the Figures, other examples are not marked.

Figure 3:
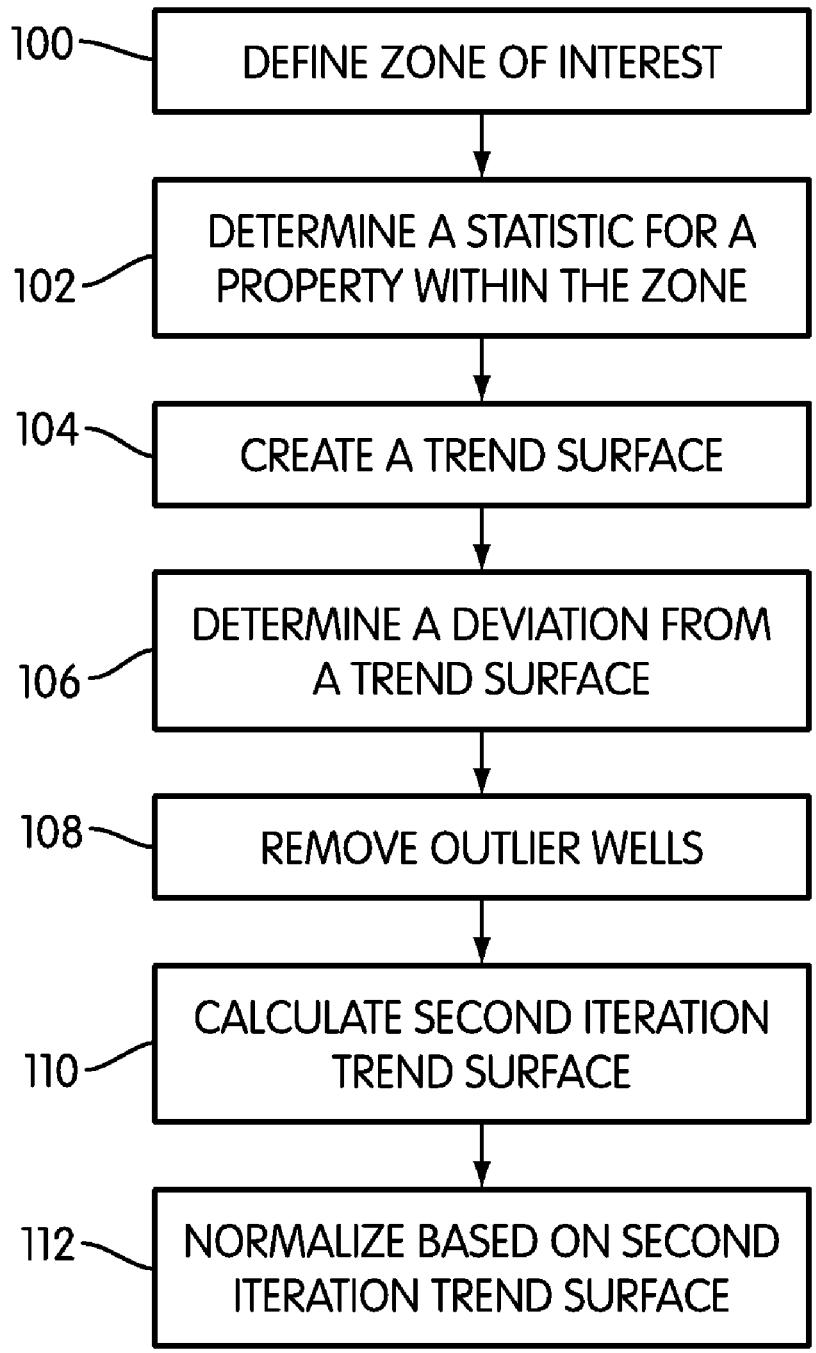
FIG. 3 is a flow chart illustrating a method in accordance with an embodiment of the present invention.

A method of performing the normalization on the well logs of FIG. 1 to produce the well logs of FIG. 2 is illustrated in the flow chart of FIG. 3. First, a zone of calibration is defined on each well log 100. For example, the zone of interest can be defined by locating markers that define a top and bottom of a portion of each log that appears to correspond to common portions of the other logs. The zone of calibration may be selected such that the well data properties in the interval of calibration is from geological knowledge of the stratigraphic history of the area expected to have simple paleo-geographic trends. Once the zone of calibration is defined, the method proceeds by determining a statistic for a property within the zone for each well log 102. For example, a suitable statistic might be a mean, or 10-50-90 statistics for the log. A first-iteration trend surface is created by fitting a smooth function to the determined statistic 104. For each statistic, a deviation from the trend surface is determined 106. In order to reduce the effects of outliers, those statistics that deviate from the trend surface by more than a threshold amount are eliminated 108.

The threshold can be predetermined, or can be calculated during the execution of the method. One example of a suitable threshold is one standard deviation from the mean. For 10-50-90 statistics, each may be evaluated against a respective one standard deviation threshold. Once the thresholds have been applied, a function is fit to the remaining statistics to create a second-iteration trend surface 110. In an embodiment, the fitted function is a smooth function. Finally, the property is normalized based on the second-iteration trend surface 112.

In an embodiment, the normalizing includes shifting the statistic for the property for each well to the trend surface. As will be appreciated, normalization in accordance with embodiments of the invention can reduce changes due to changes in gain and/or shifts (offsets) in output of the logging tool.

One example of a particular method of normalizing the well logs in accordance with an embodiment of the invention is to begin with well logs that include at least an interval of interest. While the logs may be derived from depths that are not exactly equal, they should generally overlap and include common geological features. In an embodiment, portions of the logs are selected by defining top and base markers for each well, thereby defining the zone of calibration.

Each well in the group should have a property that requires normalization. In an embodiment, the property is continuous and is normalizable by either shifting the mean value or shifting the mean and adjusting the standard deviation.

The method may include pre-defined or user-definable parameters including lateral smoothing scale, and maximum deviation. The lateral smoothing scale can be increased for cases in which the well-to-well variation in a mean value of the property is not considered to be reflective of true variations in the reservoir. For example, this might be true when an area-blanketing marine shale shows unexpected variations in log properties. The maximum deviation can be adjusted upward in order to reduce a number of wells that are considered to be outliers. This might be useful where there are relatively few wells with a large variation, such that removal of the outliers would leave a sample size too small to provide significant normalization.

In an example of an embodiment, first an average value of the property is calculated between the top and base marker for each well. A least square fit to the average values can be calculated at a series of spatial locations that can be connected to form a surface with smoothly varying property variations. One embodiment of this process is to use discrete smooth interpolation which is available in the commercial software package Gocad licensed by the vendor Paradigm Geophysical. The smoothness of the fit surface is a function of the input lateral smoothing scale. The larger this input parameter the smoother the fit surface. As the lateral smoothing scale gets larger and approaches infinity, the trend surface becomes a single value.

The average values of the property are used to create a first iteration trend surface using discrete smooth interpolation. Once the first iteration trend surface has been established, a deviation of each mean value of the property for each well is computed. Each well that has a mean value that deviates further than the maximum deviation is considered to be an outlier, and removed from the process prior to performing a second iteration.

All wells having average property values that deviate further than the input maximum deviation are removed prior to performing the second iteration. In the second iteration, the steps are the same, simply excluding the outlier wells. Once the second iteration trend surface is calculated, the well log mean is shifted to the trend surface by subtracting deviation from the trend and storing the new result as a normalized curve property.

Figure 4:
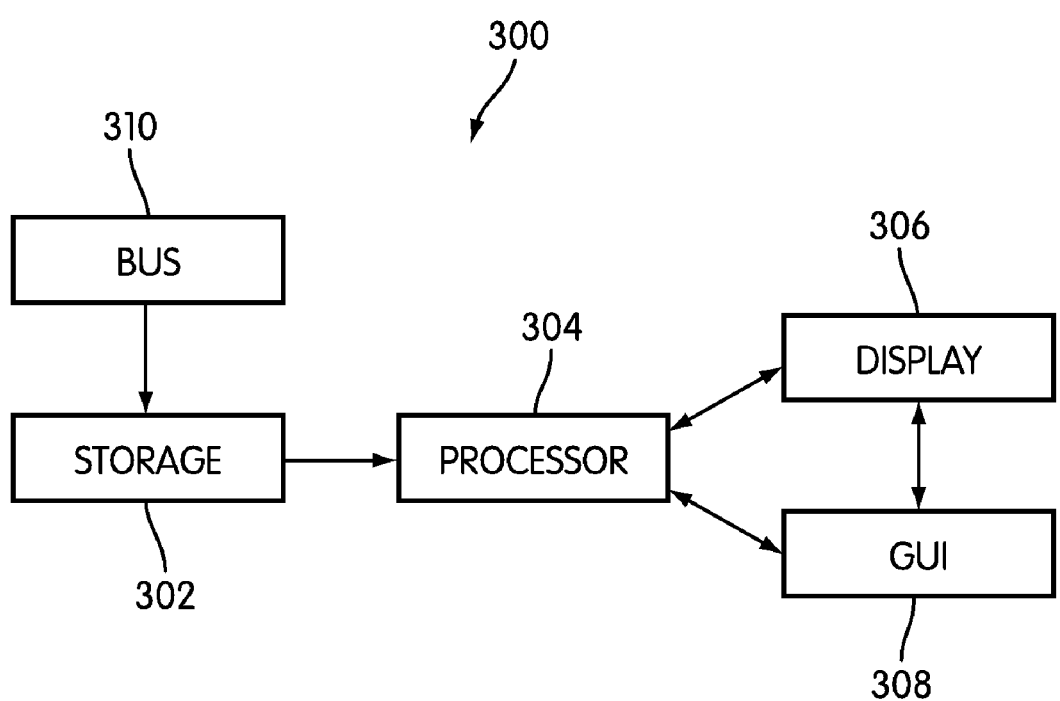
FIG. 4 is a schematic illustration of an embodiment of a system for performing methods in accordance with embodiments of the present invention.

A system for performing the method is schematically illustrated in FIG. 4. A system 300 includes a data storage device or memory 302. The stored data may be made available to a processor 304, such as a programmable general purpose computer. The processor 304 may include interface components such as a display 306 and a graphical user interface 308. The graphical user interface may be used both to display data and processed data products and to allow the user to select among options for implementing aspects of the method. Data may be transferred to the system 300 via a bus 310 either directly from a data acquisition device, or from an intermediate storage or processing facility (not shown).

Once the logs are normalized, they may be manipulated or used as any typical well log might be. The normalized logs may be, for example, more easily tied using machine assisted or automated processing based on similarity of common structures.

Although the invention has been described in detail for the purpose of illustration based on what is currently considered to be the most practical and preferred embodiments, it is to be understood that such detail is solely for that purpose and that the invention is not limited to the disclosed embodiments, but, on the contrary, is intended to cover modifications and equivalent arrangements that are within the spirit and scope of the appended claims. For example, though reference is made herein to a computer, this may include a general purpose computer, a purpose-built computer, an ASIC programmed to execute the methods, a computer array or network, or other appropriate computing device. As a further example, it is to be understood that the present invention contemplates that, to the extent possible, one or more features of any embodiment can be combined with one or more features of any other embodiment.

What is claimed is:

1. A computer-implemented method of normalizing well log data relating to geology of a subsurface region, comprising:

identifying, via a computer, a pair of markers defining a zone on each of a plurality of well logs;

determining, via a computer, a statistic for a property within the zone for each well log;

fitting, via a computer, a smooth function to the statistics to create a first-iteration trend surface;

determining, via a computer, for each statistic, a deviation from the trend surface and eliminating those statistics that deviate from the trend surface by greater than a threshold value;

fitting, via a computer, a smooth function to the remaining statistics to create a second-iteration trend surface; and normalizing, via a computer, the property for each well log based on the second-iteration trend surface.

2. The method in accordance with claim 1, wherein the normalizing the property comprises shifting the statistic for the property for each well to the trend surface.

3. The method in accordance with claim 1, wherein the statistic comprises a mean.

4. The method in accordance with claim 3, wherein the threshold value comprises one standard deviation from the mean.

5. The method in accordance with claim 1, wherein the statistic comprises 10-50-90 percentiles.

6. The method in accordance with claim 5, wherein the threshold value for the 10 percentile trend surface comprises one standard deviation of the 10 percentile statistics, the threshold value for the 50 percentile trend surface comprises one standard deviation of the 50 percentile statistics and the threshold value for the 90 percentile trend surface comprises one standard deviation of the 90 percentile statistics.

7. The method in accordance with claim 1, wherein normalizing the property based on the second-iteration trend surface comprises changing the 10-50-90 percentile statistics of each well log to fit each corresponding trend surface by rescaling and shifting the log values and storing the new result as a normalized curve property.

8. The method in accordance with claim 1, wherein the defined zone is selected on the basis of a geologic feature common to each well log.

9. The method in accordance with claim 1, wherein the normalization reduces an effect of a change in gain of logging equipment used to produce the well log data.

10. The method in accordance with claim 1, wherein the normalization reduces an effect of a shift in output of logging equipment used to produce the well log data.

11. The method in accordance with claim 1, further comprising analyzing the normalized properties to determine the geology of the subsurface region.

12. A system for performing a method of normalizing well log data relating to geology of a subsurface region comprising:

a data storage device having computer readable data including data relating to a plurality of well logs; and a processor, configured and arranged to execute machine executable instructions stored in a processor accessible memory for performing a method comprising:

identifying a pair of markers defining a zone on each well log, determining a statistic for a property within the zone for each well log;

fitting a smooth function to the statistics to create a first-iteration trend surface;

determining, for each statistic, a deviation from the trend surface and eliminating those statistics that deviate from the trend surface by greater than a threshold value;

fitting a smooth function to the remaining statistics to create a second-iteration trend surface; and normalizing the property for each well log based on the second-iteration trend surface.

13. The system in accordance with claim 12, wherein the parameters comprise a lateral smoothing scale for adjusting the fitting.

14. The system in accordance with claim 12, wherein the parameters comprise a maximum deviation for the determining.

15. The system in accordance with claim 12, further comprising a user interface configured and arranged to allow a user to input parameters for controlling the method.

* * * * *